United States Patent
Ju et al.

(10) Patent No.: US 10,992,483 B2
(45) Date of Patent: Apr. 27, 2021

(54) PHYSICALLY UNCLONABLE FUNCTION DEVICE FOR USE IN USER AUTHENTICATION SYSTEM AND OPERATION METHOD THEREOF

(71) Applicant: KOREA INSTITUTE OF SCIENCE AND TECHNOLOGY, Seoul (KR)

(72) Inventors: Hyunsu Ju, Seoul (KR); Gyosub Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 99 days.

(21) Appl. No.: 16/424,024

(22) Filed: May 28, 2019

(65) Prior Publication Data
US 2019/0363898 A1 Nov. 28, 2019

(30) Foreign Application Priority Data
May 28, 2018 (KR) .................. 10-2018-0060118

(51) Int. Cl.
*H04L 29/06* (2006.01)
*H04L 9/32* (2006.01)
*G11C 13/00* (2006.01)

(52) U.S. Cl.
CPC ........ *H04L 9/3278* (2013.01); *G11C 13/0026* (2013.01); *G11C 13/0028* (2013.01)

(58) Field of Classification Search
None
See application file for complete search history.

(56) References Cited

U.S. PATENT DOCUMENTS

| 7,757,083 B2* | 7/2010 | Devadas | H04L 9/3278 713/168 |
|---|---|---|---|
| 10,002,277 B1* | 6/2018 | Endress | H04L 9/0643 |
| 2003/0204743 A1* | 10/2003 | Devadas | G06Q 20/3674 726/9 |
| 2004/0042292 A1* | 3/2004 | Sakata | G11C 7/1096 365/202 |
| 2012/0106235 A1* | 5/2012 | Christensen | G11C 7/24 365/149 |
| 2012/0191923 A1* | 7/2012 | Pekny | G06F 3/0679 711/154 |
| 2014/0108786 A1* | 4/2014 | Kreft | G06Q 20/3825 713/156 |

(Continued)

FOREIGN PATENT DOCUMENTS

| JP | 2014-503104 A | 2/2014 |
|---|---|---|
| KR | 10-2004-0079918 A | 9/2004 |

(Continued)

*Primary Examiner* — Maung T Lwin

(57) ABSTRACT

A physically unclonable function (PUF) device includes a memory cell array including a plurality of memory cells, a selecting circuit configured to select one or more memory cells among the plurality of memory cells in response to a challenge, and a sense amplifier and quantizer configured to generate a quantize signal from the selected memory cell. The number of quantization sections for generating the quantize signal may be different from the number of resistance state distributions generated from the selected memory cell. One or more quantization sections may exist in one resistance state distribution section.

18 Claims, 10 Drawing Sheets

(56) References Cited

U.S. PATENT DOCUMENTS

| | | | |
|---|---|---|---|
| 2015/0071432 A1* | 3/2015 | Zhu | G11C 11/161 380/28 |
| 2015/0161415 A1* | 6/2015 | Kreft | G06F 21/335 713/194 |
| 2016/0028544 A1* | 1/2016 | Hyde | G06F 3/0637 380/44 |
| 2017/0141929 A1* | 5/2017 | Afghah | H04L 9/3278 |
| 2017/0180140 A1 | 6/2017 | Mai et al. | |

FOREIGN PATENT DOCUMENTS

| | | |
|---|---|---|
| KR | 10-1485727 B1 | 1/2015 |
| KR | 10-2015-0071003 A | 6/2015 |

\* cited by examiner

PHYSICALLY UNCLONABLE FUNCTION DEVICE FOR USE IN USER AUTHENTICATION SYSTEM AND OPERATION METHOD THEREOF

CROSS-REFERENCE TO RELATED APPLICATIONS

This US non-provisional patent application claims priority under 35 USC § 119 to Korean Patent Application No. 10-2018-0060118, filed on May 28, 2018, the entirety of which is hereby incorporated by reference.

BACKGROUND

Inventive concepts relates to user authentication systems and, more particularly, to a physically unclonable function (PUF) device for use in a user authentication system and an operation method thereof.

A PUF device is a device having a physically unclonable function and may be used in a user authentication system. The user authentication system requires a detection device for detecting an external attack to protect data or key from the external attack. When an external attack is detected, the user authentication system responds to the external attack in a manner of blocking a power or stopping the operation of a circuit. However, additional cost is incurred to use the detection device and a side-channel attack may be encountered. Thus, a key is not separately stored and a circuit or a logic playing a role such as fingerprint authentication is implemented to be used as a key. A PUF device is representatively used in this technology.

Even though internal circuits have the same internal configuration, wire delay or gate delay occurs according to a process of implementing the internal circuits, causing a minute difference in their characteristics. A PUF device uses a difference in operation characteristics. Since the PUF device uses a delay difference according to a process, physically clonable circuits having the same output cannot be implemented even if the PUF device is opened. A PUF device circuit may be classified as a ring oscillator type using a delay loop and an arbiter type using a switching circuit. A PUF device may be implemented using these two types together.

A conventional PUF device generates a single response for a single challenge. Since the conventional PUF device has a one-to-one challenge-response pair (CRP), it may be vulnerable to an external attack. That is, less randomness for a single challenge causes the conventional PUF device to encounter many problems to solve for use in a user authentication system.

SUMMARY

Embodiments of inventive concepts relate to a PUF device that has a strong defense against an external attack by enhancing randomness for a challenge and an operation method of the PUF device.

A physically unclonable function (PUF) device according to example embodiments of inventive concepts includes a memory cell array including a plurality of memory cells, a selecting circuit configured to select one or more memory cells among the plurality of memory cells in response to a challenge, and a sense amplifier and quantizer configured to generate a quantize signal from the selected memory cell. The number of quantization sections for generating the quantize signal may be different from the number of resistance state distributions generated from the selected memory cell. One or more quantization sections may exist in one resistance state distribution section.

In example embodiments, the plurality of memory cells may be multi-level cells (MLCs). Address information for selecting one or more memory cells among the plurality of memory cells and information on a resistance state level of the selected memory cell may be included in the challenge. In addition, resistance state-data matching information of the selected memory cell may be included in the challenge.

In example embodiments, the plurality of memory cells may be nonvolatile memory cells. The nonvolatile memory cell may be a memory cell of a resistive RAM (RRAM). The PUF device may further include a key generator configured to generate a key from the quantize signal. The selecting circuit may include a row decoder configured to select one or more wordlines in response to row address information included in the challenge and a column decoder configured to select one or more bitlines in response to column address information included in the challenge. One or more memory cells among the plurality of memory cells may be selected by the selected wordline and the selected bitline.

Example embodiments of inventive concepts provide an operation method of a physically unclonable function (PUF) device for use in a user authentication system. The operation method includes selecting one or more memory cells among a plurality of memory cells in response to a challenge and performing program and initialize operations on the selected memory cell and generating a quantize signal from the selected memory cell. The PUF device may divide a resistance state distribution for the selected memory cell into predetermined quantization sections to generate the quantize signal.

In example embodiments, the PUF device may be an MLC nonvolatile memory configured to store a plurality of data bits in a single memory cell. The MLC nonvolatile memory may be a resistive RAM (RRAM). The user authentication system may further include a server configured to provide the challenge to the PUF device. The operation method may further include generating a key through the quantize signal, encrypting the key, and providing the encrypted key to the server.

In example embodiments, the challenge may include address information for selecting one or more memory cells among the plurality and information on a resistance state level of the selected memory cell. The PUF device may include a resistive RAM (RRAM) including a plurality of memory cells and a memory controller configured to control the RRAM, and the memory controller may receive the challenge and control a resistance state-data matching scheme of the selected memory cell.

BRIEF DESCRIPTION OF THE DRAWINGS

The forgoing and other features of inventive concepts will be described below in more detail with reference to the accompanying drawings of non-limiting embodiments of inventive concepts in which like reference characters refer to like parts throughout the different views. The drawings are not necessarily to scale, emphasis instead being placed upon illustrating principles of inventive concepts. In the drawings.

DETAILED DESCRIPTION

Figure 1:
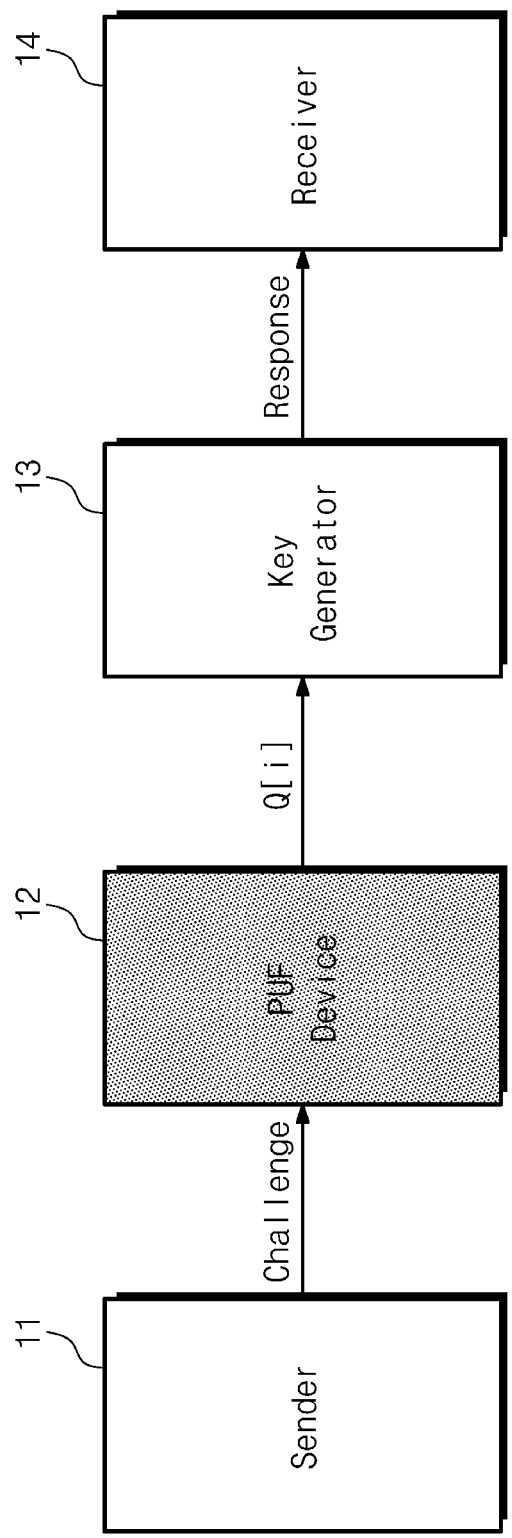
FIG. 1 is a block diagram of a user authentication system according to example embodiments of inventive concepts.

Example embodiments will now be described more fully with reference to the accompanying drawings, in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

FIG. 1 is a block diagram of a user authentication system 10 according to example embodiments of inventive concepts. As illustrated, the user authentication system 10 may include a sender 11, a PUF device 12, a key generator 13, and a receiver 14.

The sender 11 may generate a challenge for user authentication, and the receiver 14 may receive a response. The user authentication system 10 may perform a user authentication operation using a challenge-response pair (CRP). Although it is shown in FIG. 1 that the sender 11 and the receiver 14 are separated from each other, they may be implemented as single device for user authentication (e.g., a host or a server).

The PUF device 12 may receive a challenge and output a quantize signal Q[i]. The PUF device 12 is a memory having a physically unclonable function, which may secure randomness by process variation and stochastic switching.

The PUF device 12 may be implemented using a nonvolatile memory (NVM). Nonvolatile memories may include a resistive random access memory (RRAM), a phase-change random access memory (PRAM), a magneto-resistive random access memory (MRAM), a ferroelectric random access memory (FRAM), a spin transfer torque random access memory (STT-RAM), a NOR-type flash memory, and the like.

The PUF device 12 includes a memory cell array which includes a plurality of memory cells. It is advantageous for the PUF device 120 to use a memory cell having a large cell-to-cell variation even through the same fabrication process. Also it is advantageous for the PUF device 120 to use a memory cell having a large cycle-to-cycle variation when a program-erase (or initialize) cycle is repeated on the same memory cell. The cell-to-cell variation or the cycle-to-cycle variation may mean a variation in resistance distribution or threshold voltage between memory cells.

Single bit data or multi-bit data of two or more bits may be stored in each memory cell of the PUF device 12. A memory cell storing a single bit of data may store data "1" or "0". A memory cell storing two bits of data may store data "11", "10", "01" or "00". A memory cell storing three bits of data may store data "111", "100", . . . , and "000".

A challenge applied to the PUF device 12 may include information on an address to select a memory cell and a resistance state level (or threshold voltage level) of a selected memory cell. The PUF device 12 may receive the challenge and apply a program voltage or an initialize voltage to selected memory cells. The PUF device 12 may repeatedly perform program-initialize operations on selected memory cells and read out a current flowing to the selected memory cells to generate a quantize signal Q[i]. The quantize signal Q[i] may be output in a bit string form.

The key generator 13 may receive the quantize signal Q[i] from the PUF device 12 and generate an encrypted key. The user authentication system 10 may encounter an external attack such as probing, fault injection or power analysis. The key generator 10 may encrypt a quantize signal and generate an encrypted key to protect data from the external attack. The encrypted key may be provided to a response for user authentication.

Although it is shown in FIG. 1 that the key generator 13 is disposed outside the PUF device 12, the key generator 13 may be included in the PUF device 12. The key generator 13 may generate a key without encrypting a quantize signal.

The user authentication system 10 according to example embodiments of inventive concepts includes a PUF device 12 based on a nonvolatile memory n which single bit data or multi-bit data can be stored in a single memory cell. In inventive concepts, a physically unclonable function is reconfigurable and randomness may be enhanced using a nonvolatile memory. According to inventive concepts, an authentication operation may be performed more safely. The user authentication system 10 may be implemented using various types of PUF device 12.

Figure 2:
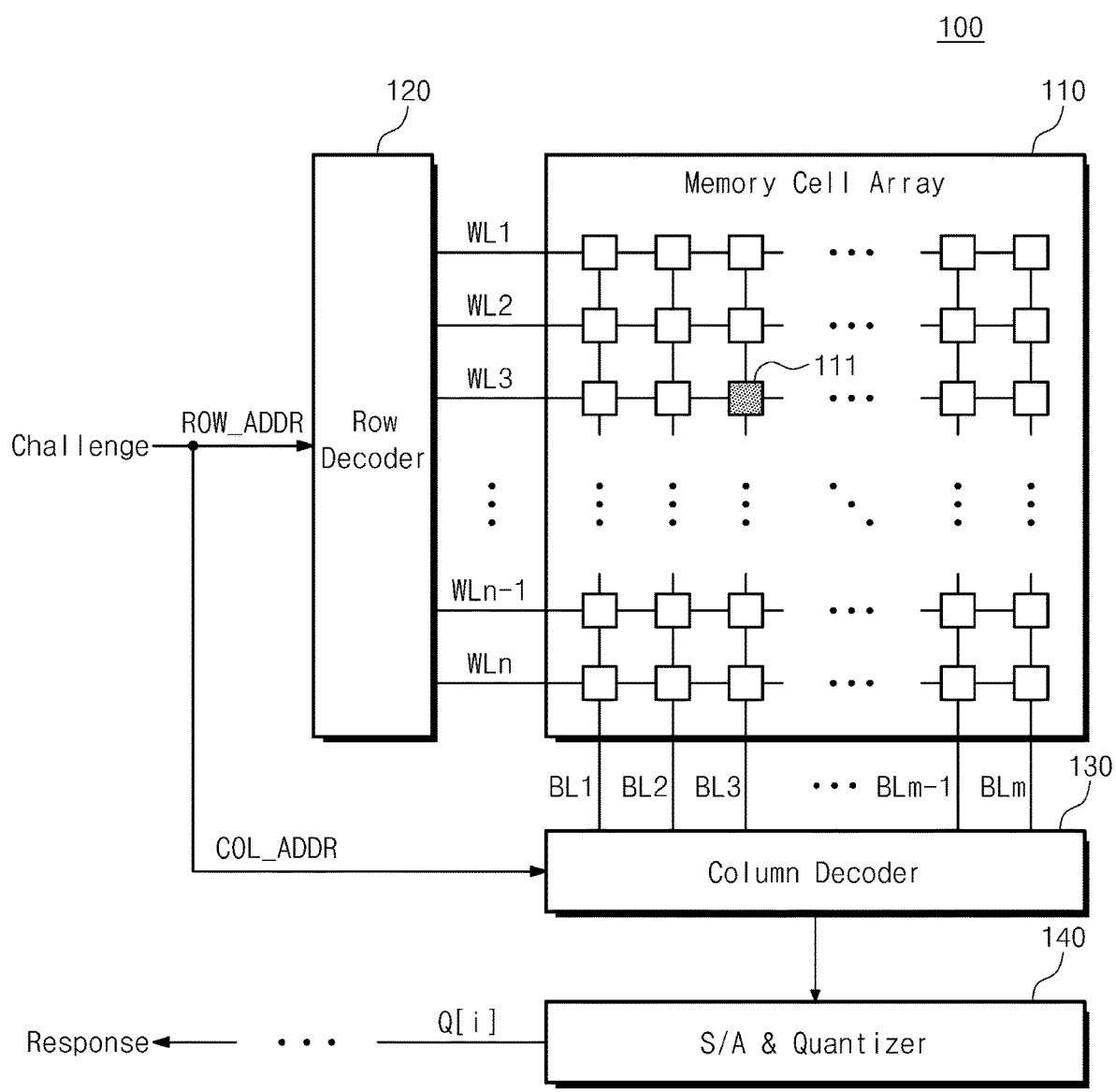
FIG. 2 is a block diagram illustrating an example in which a PUF device shown in FIG. 1 is implemented using a resistive RAM (RRAM)

FIG. 2 is a block diagram illustrating an example in which a PUF device shown in FIG. 1 is implemented using a resistive RAM (RRAM). An RRAM may intrinsically exhibit a great resistance distribution difference between memory cells even through the same fabrication process. Due to this physical property, the RRAM may be effectively used in a PUF device. The RRAM may have randomness and uniqueness which are basic elements of a PUF device.

Referring to FIG. 2, an RRAM 100 may include a memory cell array 110, a row decoder 120, a column decoder 130, and a sense amplifier and quantizer (S/A & Quantizer) 140. The memory cell array 110 may a plurality of memory cells coupled between a plurality of wordlines WL1 to WLn and a plurality of bitlines BL1 to BLm.

A memory cell of the RRAM 100 may include various materials (e.g., Pt/HfO2/Ta/TiN) which can store data according to resistance variation. Single-bit data or multi-bit data may be stored in a single memory cell of the RRAM 100. A memory cell which can store multi-bit data is called a multi-level memory cell (MCL), and a nonvolatile memory which can store multi-bit data is called an MLC NVM.

The row decoder 120 may be connected to the memory cell array 110 through the plurality of wordlines WL1 to WLn. The row decoder 120 may receive a row address ROW ADDR and select a single wordline. When the number of wordlines is 64, a row address may be 8 bits. The row decoder 120 may use a predetermined bit (e.g., first bit to eight bit) of a challenge as a row address. A voltage or current required for a write or read operation may be provided to a wordline selected by the row decoder 120.

The column decoder 130 may be connected to the memory cell array 110 through the plurality of bitlines BL1 to BLm. The column decoder 130 may provide a voltage or current required for a write or read operation to a bitline selected by a column address COL_ADDR. The column decoder 130 may use a predetermined bit (e.g., ninth bit to twentieth bit) of the challenge as a column address.

In the example of FIG. 2, a third wordline WL3 is selected by the row address ROW ADDR and a third bitline BL3 is selected by the column address COL_ADDR. The RRAM 100 may select a single memory cell 111 connected in common to the third wordline WL3 and the third bitline BL3. The RRAM 100 may program or initialize a selected memory cell 111 based on resistance state level information.

The sense amplifier and quantizer 140 may sense a voltage level of the bitline BL3 connected to the selected memory cell 111 and a current flowing to the selected memory cell 111. The sense amplifier and quantizer 140 may obtain resistance state levels of the selected memory cell 111 based on the sensed voltage or current and generate a quantize signal Q[i] through the resistance state level. An operation method of the sense amplifier and quantizer 140 will be described later in further detail with reference to FIG. 4.

Figure 3:
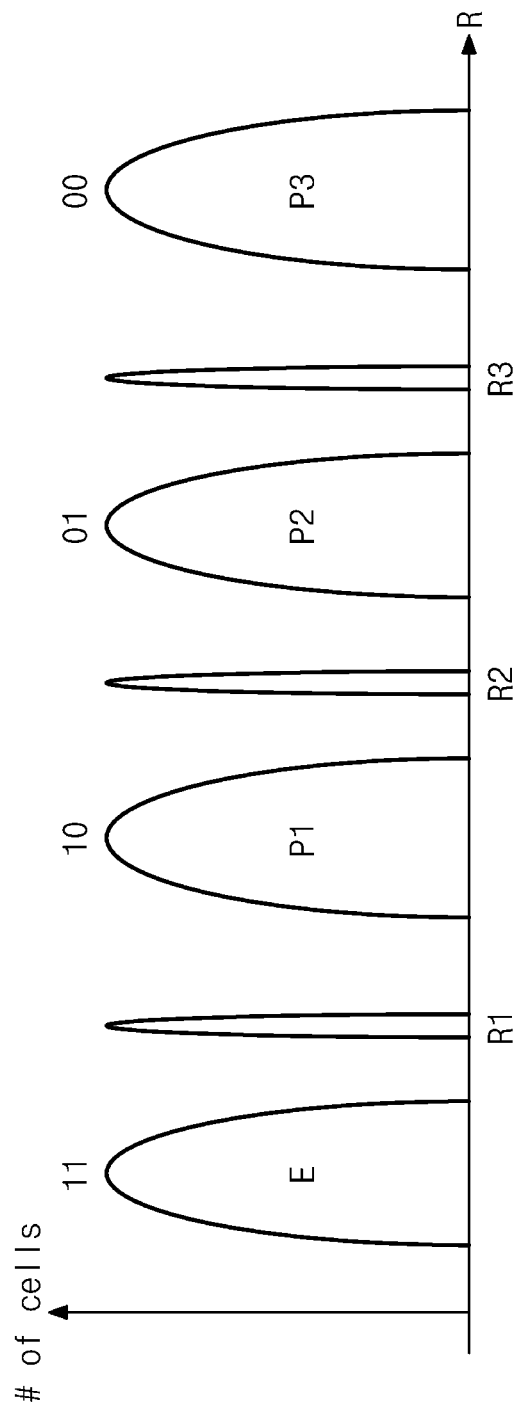
FIG. 3 is a graph illustrating an ideal memory cell resistance distribution of the RRAM shown in FIG. 2.

FIG. 3 is a graph illustrating an ideal memory cell resistance distribution of the RRAM shown in FIG. 2. In FIG. 3, x-axis denotes a resistance R and y-axis denotes the number of cells (# of cells). A memory cell shown in FIG. 2 may have one of a plurality of resistance states. For example, when two bits of data is stored in a single memory cell, the memory cell may have four resistance states according to a resistance distribution. When three bits of data is stored in a single memory cell, the memory cell may have one of eight resistance states.

Referring to FIG. 3, a memory cell may have four resistance states E, P1, P2, and P3 according to a resistance R. The four resistance states may include an initialize state E and the first to third program states P1, P2, and P3. The initialize state E and the first program state P1 may divided by a first reference resistor R1, the first and second program states P1 and P2 may be divided b a second reference resistor R2, and the second and third program states P2 and P3 may be divided by a third reference resistor R3.

A memory cell in the initialize state may have data "11". Memory cells in the first to third program states P1, P2, and P3 may have data "10", "01", and "00". Data depending on each resistance state may be changed as much as required according to a state-data matching scheme. For example, a memory cell in the initialize state E may have data "00" and a memory cell in the third program state P3 may have data "11". Memory cells in the first and second program states P1 and P2 may have data "01" and "10", respectively.

The state-data matching information may be included in the challenge. That is, the challenge may include the state-data matching information in addition to an address and a resistance state level of the selected memory cell. When the state-data matching information is included in the challenge, randomness of the RRAM may be further enhanced.

Figure 4:
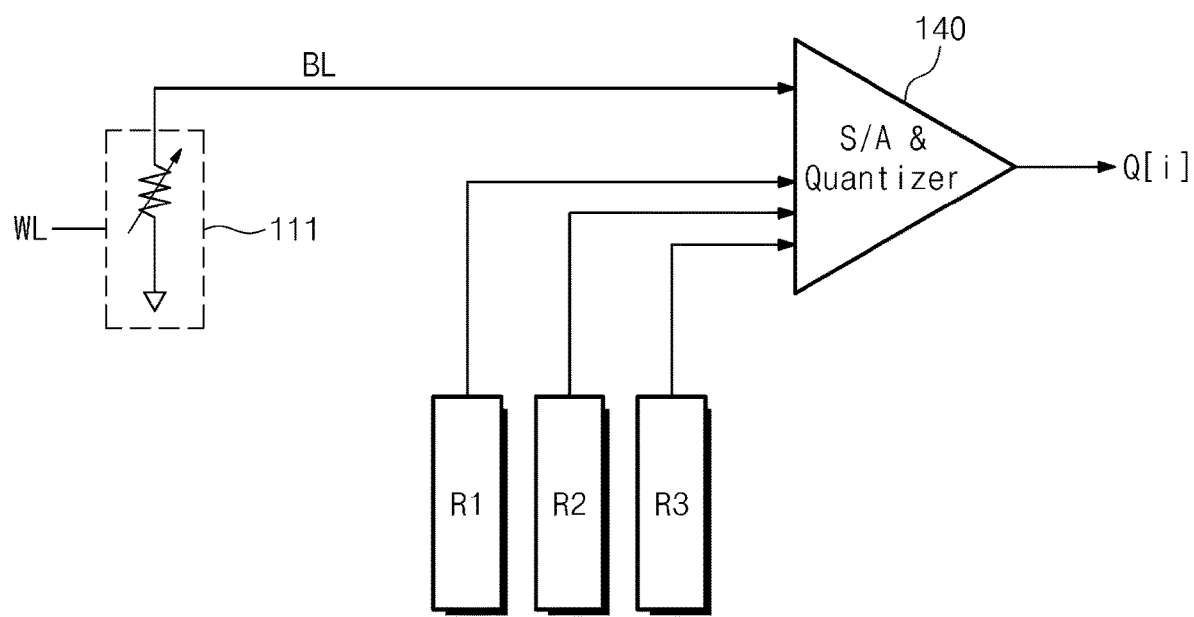
FIG. 4 is a block diagram illustrating the operation of a sense amplifier and quantizer shown in FIG. 2.

FIG. 4 is a block diagram illustrating the operation of the sense amplifier and quantizer s140 shown in FIG. 2. Referring to FIG. 4, the sense amplifier and quantizer 140 may compare a current flowing to a selected memory cell 111 with a current flowing to first to third reference resistors R1, R2, and R3 and output a quantize signal Q[i] as a result of the comparison.

When a selected memory cell is in an initialize state E, a resistance state level of the selected memory cell 111 may be lower than resistance levels of the first to third reference resistors R1, R2, and R3. The resistance state level of the selected memory cell 111 in the first program state P1 may be higher than a resistance level of the first reference resistor R1 and lower than resistance levels of the second and third reference resistors R2 and R3. The resistance state level of the selected memory cell 111 in the second program state P2 may be higher than the resistance levels of the first and second reference resistors R1 and R2 and lower than the resistance level of the third reference resistor R3. The resistance state level of the selected memory cell 111 in the third program state P3 may be higher than the resistance levels of the first to third reference resistors R1, R2, and R3.

The sense amplifier and quantizer 140 may know the resistance state level of the selected memory cell 111 by comparison with the resistance levels of the first to third reference resistors R1, R2, and R3. Alternatively, the sense amplifier and quantizer 140 may also know the resistance state level of the selected memory cell 111 by comparing a read-out current flowing to the selected memory cell 111 with the current flowing to the first to third resistors R1, R2, and R3. The operation method of the sense amplifier and quantizer 140 described with reference to FIG. 4 is merely exemplary, and the resistance state level of the selected memory cell 111 may be known by various other methods.

Figure 5:
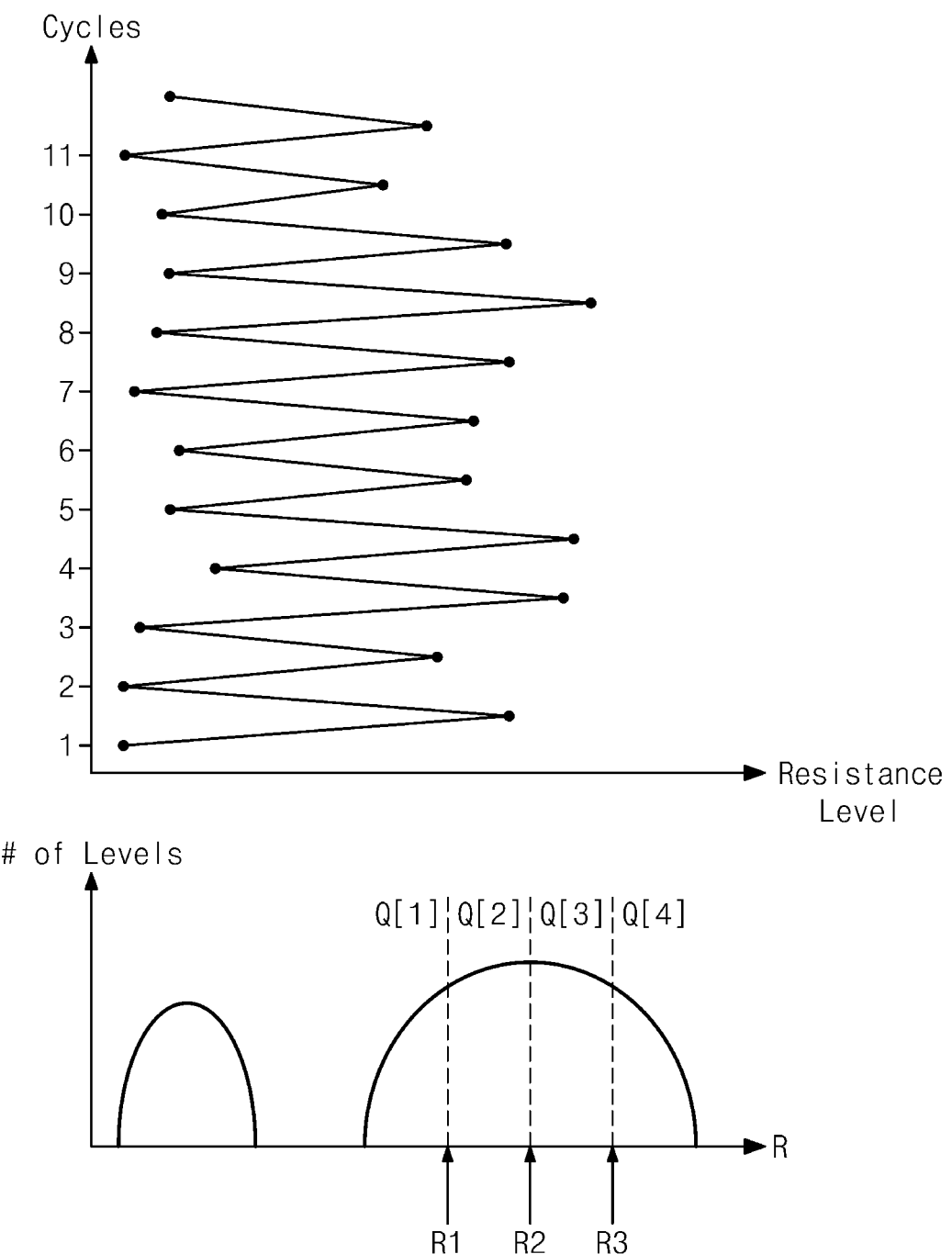
FIG. 5 is a graph illustrating a resistance state level depending on a program-initialize cycle of a selected memory cell shown in FIG. 5.

FIG. 5 is a graph illustrating a resistance state level depending on a program-initialize cycle of a selected memory cell shown in FIG. 5. Referring to FIG. 5, a selected memory cell 111 (see FIG. 4) repeats a program-initialize cycle (P/E cycle) eleven times, for example.

In FIG. 5, an upper graph represents a resistance level depending on the program-initialize cycle and a lower graph represents the number of levels (# of Levels) depending on a resistance distribution R. The number of levels (# of Levels) means the number of resistance levels obtained in respective cycles of the upper graph. When the number of levels depending on the resistance distribution R is represented by a graph, a normal distribution curve may be obtained in an initialize state and a program state, as shown by the lower graph in FIG. 5.

The resistance level of the selected memory cell 111 may vary each time a program-initialize cycle is repeated on the selected memory cell 111, which is called a cycle-to-cycle variation. A resistive RAM (RRAM) may obtain resistance distribution characteristics due to the cycle-to-cycle variation, as shown by the lower graph in FIG. 5. The RRAM 100 according to example embodiments of inventive concepts may enhance randomness due to a cycle-to-cycle variation of a memory cell.

Continuing to refer to FIG. 5, the number of quantization sections for generating a quantize signal may be different from the number of resistance state distributions generated from the selected memory cell 111. In the example of FIG. 5, a resistance state section of a program state is divided into four quantization sections based on the first to third reference resistors R1, R2, and R3. A quantize signal may be generated in each quantization section.

The table 1 below shows exemplary quantize signals generated by the first to third resistors R1, R2, and R3 shown in FIG. 5.

TABLE 1

| | |
|---|---|
| Q[1] | 0110 ... 001011 |
| Q[2] | 1101 ... 010111 |
| Q[3] | 1010 ... 111000 |
| Q[4] | 0111 ... 110011 |
| Q[i] | 0110 ... 010111 |

(Q[i] = Q[1]⊕Q[2]⊕Q[3]⊕Q[4])

Information on an address and a resistance state level of the selected memory cell 111 may be included in a challenge. A quantize signal Q[i] may be obtained by comparing a resistance level of the selected memory cell 11 with resistance levels of the first to third reference resistors R1, R2, and R3. The sense amplifier and quantizer 140 may represent a quantize signal Q[i] of the selected memory cell as a bit string.

In the table 1, first to fourth quantize signals Q[1] to Q[4] may be obtained by allocating a read-out current of the selected memory cell 111 to a bit string through the sense amplifier and quantizer 140. The first quantize signal Q[1] is generated in a first quantization section. Similarly, the second to fourth quantize signals Q[2] to Q[4] are generated in second to fourth quantization sections, respectively. A final quantize signal Q[i] generated from the first to fourth quantize signals Q[1] to Q[4] may be obtained by various methods. An example of obtaining the quantize signal Q[i] by performing an XOR operation on the first to fourth quantize signals Q[1] to Q[4] is shown in the table 1.

Figure 6:
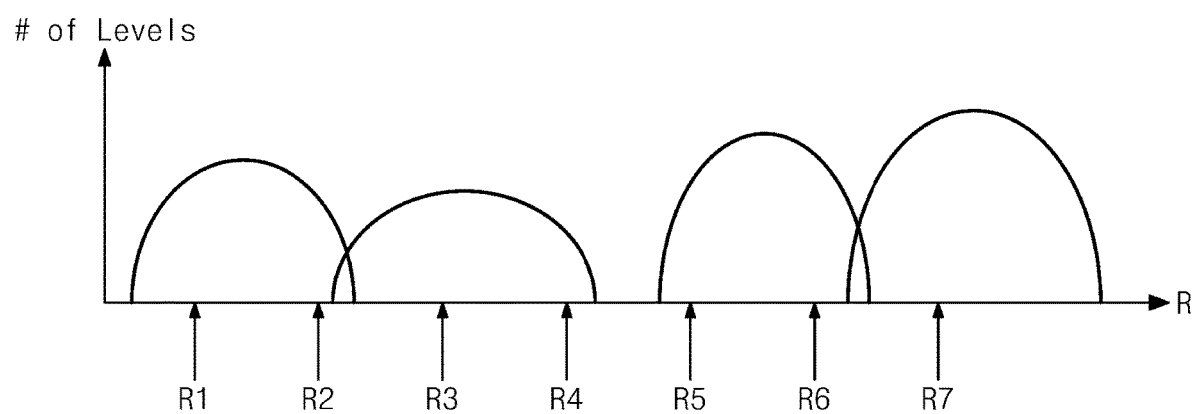
FIG. 6 is a graph illustrating a result obtained by repeating a program-initialize cycle on a selected memory cell shown in FIG. 5 with an MLC level.

FIG. 6 is a graph illustrating a result obtained by repeating a program-initialize cycle on the selected memory cell 111 shown in FIG. 5 with an MLC level. The selected memory cell 111 may have a resistance distribution shown in FIG. 6 according to a cycle-to-cycle variation.

Information on an address and resistance states of the selected memory cell 111 may be included in a challenge. When the number of the resistance states included in the challenge is four, i.e., two bits of data is programmed in the selected memory cell 111, the selected memory cell 111 may have four resistance state distributions, as shown in FIG. 6. According to a challenge applied to the selected memory cell 111, the selected memory cell 111 may perform a program-initialize cycle to have one of the four resistance states.

Continuing to refer to FIG. 6, the sense amplifier and quantizer 140 (see FIG. 4) may perform a quantize operation through first to seventh reference resistors R1 to R7. The number of reference resistors and an interval between levels of the reference resistors may vary depending on performance of the sense amplifier and quantizer 140. For example, there may be the greater number of reference resistors in a 3-bit MLC than in a 2-bit MLC and the interval between the levels of the reference resistors may be longer in the 3-bit MLC than in the 2-bit MLC. Moreover, as the performance of the sense amplifier and quantizer 140 is improved, the number of the reference resistors may increase and an interval between the levels of the reference resistors may be reduced.

Figure 7:
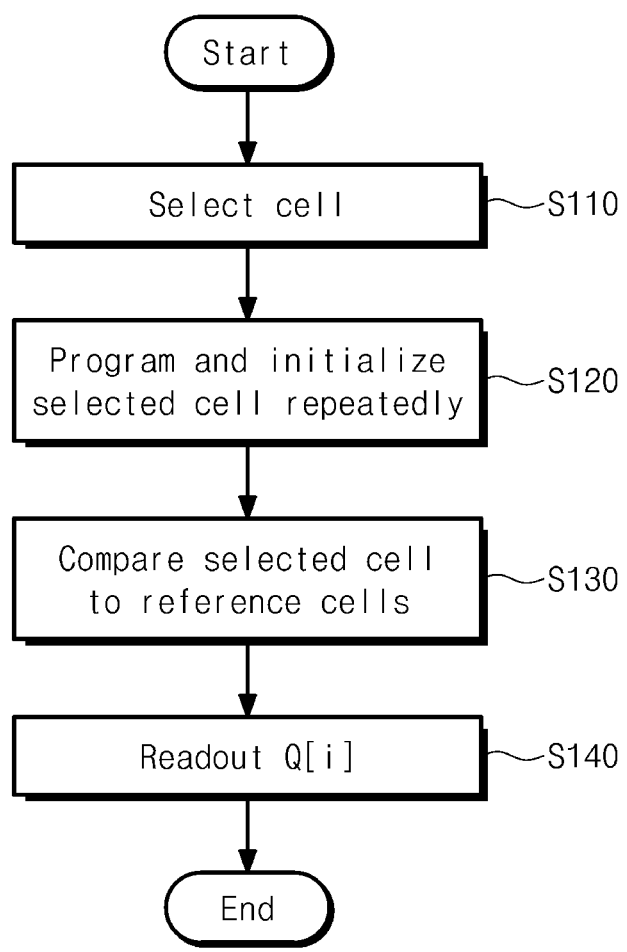
FIG. 7 is a flowchart illustrating a method for generating a quantize signal of the RRAM shown in FIG. 2.

FIG. 7 is a flowchart illustrating a method for generating a quantize signal of the RRAM 100 shown in FIG. 2. Hereinafter, a method for generating a quantize signal of a resistive RAM (RRAM) according to example embodiments of inventive concepts will now be described with reference to FIGS. 2 to 6. As described above, a challenge is provided to the RRAM 100. The challenge includes address information for selecting a memory cell and resistance state level information on what state a selected memory cell is programmed in.

In S110, a memory cell (e.g., 111) to generate a quantize signal Q[i] is selected. Although only one memory cell 111 to generate the quantize signal Q[i] is shown in FIG. 2, more memory cells may be selected. Since the RRAM 100 (see FIG. 2) may perform a random access operation, a program operation or a read operation may be rapidly performed even when a plurality of memory cells are selected.

In S120, a program-initialize operation is repeatedly performed on the selected memory cell 111. Due to a cycle-to-cycle variation, a resistance level of the selected memory cell 111 may vary whenever the selected memory cell is programmed. A resistance distribution shown in the lower graph of FIG. 5 may be obtained.

In S130, the selected memory cell 111 is compared with reference cells. A resistor of the selected memory cell 112 is compared with the reference resistors R1, R2, and R3 (see FIG. 5). A plurality of reference resistors or a plurality of resistance state levels may be formed according to the resistance state distribution of the selected memory cell 111. A plurality of resistance state levels of a reference resistor may be formed in the resistance distribution (e.g., an initialize state or a program state) of the selected memory 111.

In S140, the quantize signal Q[i] is output through the sense amplifier and quantizer 140. The quantize signal Q[i] may be obtained by allocating a read-out current of the selected memory cell 111 to a bit string through the sense amplifier and quantizer 140. The quantize signal Q[i] may be provided to the key generator 13 (see FIG. 1).

As described above, the user authentication system 10 according to example embodiments of inventive concepts may generate a challenge-response pair (CRP) with improved randomness using cell-to-cell variation or cycle-to-cycle variation characteristics.

Although a conventional PUF device has a one-to-one challenge-response pair, a PUF device according to example embodiments of inventive concepts may have a one-to-n challenge-response pair. Since a cell-to-cell variation or a cycle-to-cycle variation is large in the resistive RAM (RRAM) according to example embodiments of inventive concepts, physical cloning is substantially impossible.

Figure 8:
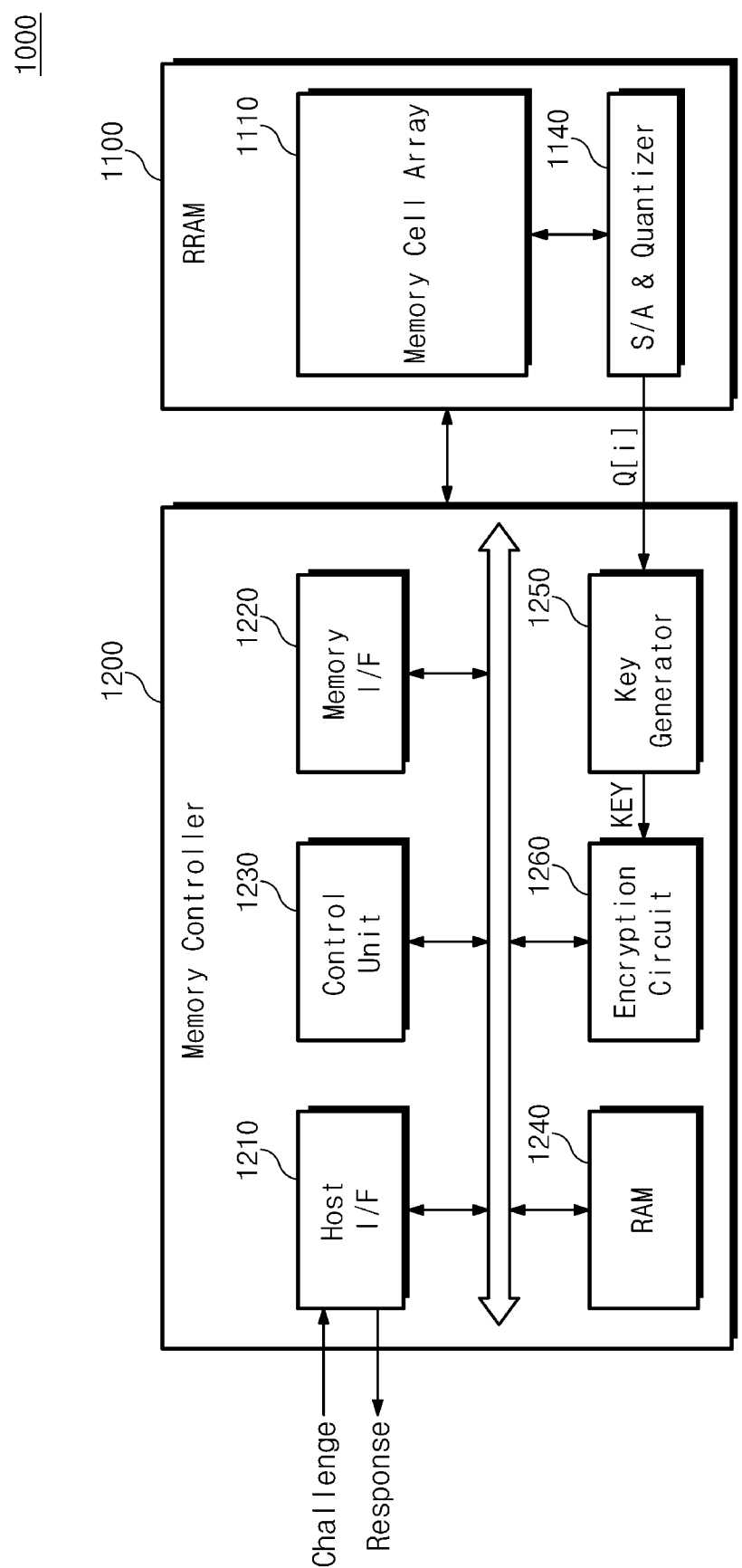
FIG. 8 is a block diagram of a PUF device including the RRAM shown in FIG. 2.

FIG. 8 is a block diagram of a PUF device including the RRAM shown in FIG. 2. Referring to FIG. 8, a PUF device 1000 includes a resistive RAM (RRAM) 1100 and a memory controller 1200. The RRAM 1100 may perform an initialize, write or read operation according to the control of the memory controller 1200.

The RRAM 1100 includes a memory cell array 1110 and a sense amplifier and quantizer (S/A & Quantizer) 1140. The RRAM 1100 is random-accessible and may perform an erase, write or read operation in unit of a memory cell or units of a plurality of memory cells.

The memory controller 1200 controls read and write operations on the RRAM 1100 in response to a request of an external entity (e.g., a host or a server). The memory controller 1200 may include a host interface 1210, a memory interface 1220, a control unit 1230, a RAM 1240, a key generator 1250, and an encryption circuit 1260.

The host interface 1210 may receive a challenge from an external entity (e.g., a host or a server) and provide a response. The host interface 1210 may be connected to a host through a PATA (Parallel AT Attachment) bus, a SATA (Serial ATA) bus, a CSI, a USB or the like. The memory interface 1220 may provide an interface with the RRAM 1100.

The control unit 1230 may control the overall operation (e.g., read, write, file system management, etc.) on the RRAM 1100. For example, although not shown in FIG. 8, the control unit 1230 may include a central processing unit (CPU), a processor, an SRAM, a DMA controller, and the like. The control unit 1230 may mange software (or algorithm) for generating a quantize signal in the RRAM 1100. Software managed by the control unit 1230 may be driven through the RAM 1240.

The RAM 1240 may be used to manage a merge operation or a mapping table. The PUF device 1000 according to example embodiments of inventive concepts may change a state-data matching scheme of the RRAM 1100 through a mapping table. For example, it will be assumed that a memory cell has data "11", "10", "01", and "00" according to a resistance distribution, as described in FIG. 3. By changing the mapping table, a memory cell may be changed to have the data "11", "10", "01", and "00" according to a resistance distribution. According to inventive concepts, randomness of the PUF device 1000 may be enhanced by changing a state-data matching scheme through the mapping table.

The RAM 1240 may operate under the control of the control unit 1230 and be used as a working memory, a buffer memory, a cache memory or the like. When the RAM 1240 is used as a working memory, the RAM 1240 may temporarily store data processed by the control unit 1230. When the RAM 1240 is used as a buffer memory, the RAM 1240 may buffer data to be transmitted from a host to the RRAM 1100 or from the RRAM 1100 to the host. When the RAM 1240 may be used as a cache memory, a low-speed RRAM 1100 may operate at high speed.

The key generator 1250 may generate a key using a quantize signal provided from the RRAM 1100. The key generator 1250 may generate a key using various methods. The key generator 1250 may generate a key by combination of user information or a quantize signal Q[i]. The PUF device 1000 according to example embodiments of inventive concepts may include the encryption circuit 1260. The encryption circuit 1260 may receive a key from the key generator 1250 and encrypt data or the quantize signal Q[i].

Figure 9:
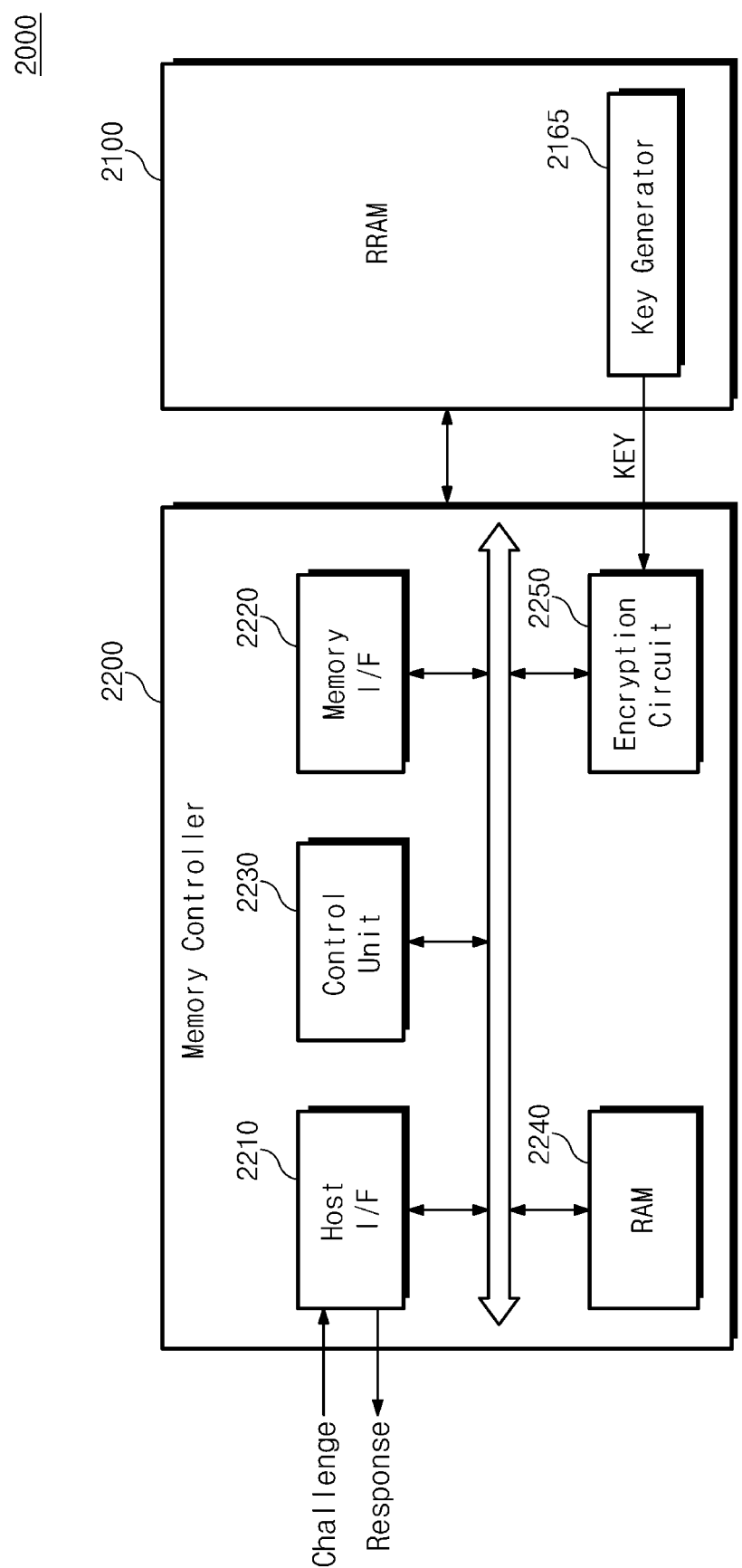
FIG. 9 is a block diagram of a PUF device according to another example embodiment of inventive concepts.

FIG. 9 is a block diagram of a PUF device according to another example embodiment of inventive concepts. Referring to FIG. 9, a PUF device 2000 includes a resistive RAM (RRAM) 2100 and a memory controller 2200. The memory controller 2200 includes a host interface 2210, a memory interface 2220, a control unit 2230, a RAM 2240, and an encryption circuit 2250.

In the PUF device 2000 shown in FIG. 9, a key generator 2165 is included in the RRAM 2100. The RRAM 2100 may internally generate a key using a quantize signal Q[i] and provide the generated key to the encryption circuit 2250 of the memory controller 2200. The PUF devices 1000 and 2000 shown in FIGS. 8 and 9 may be used in user authentication procedure of an electronic device.

Figure 10:
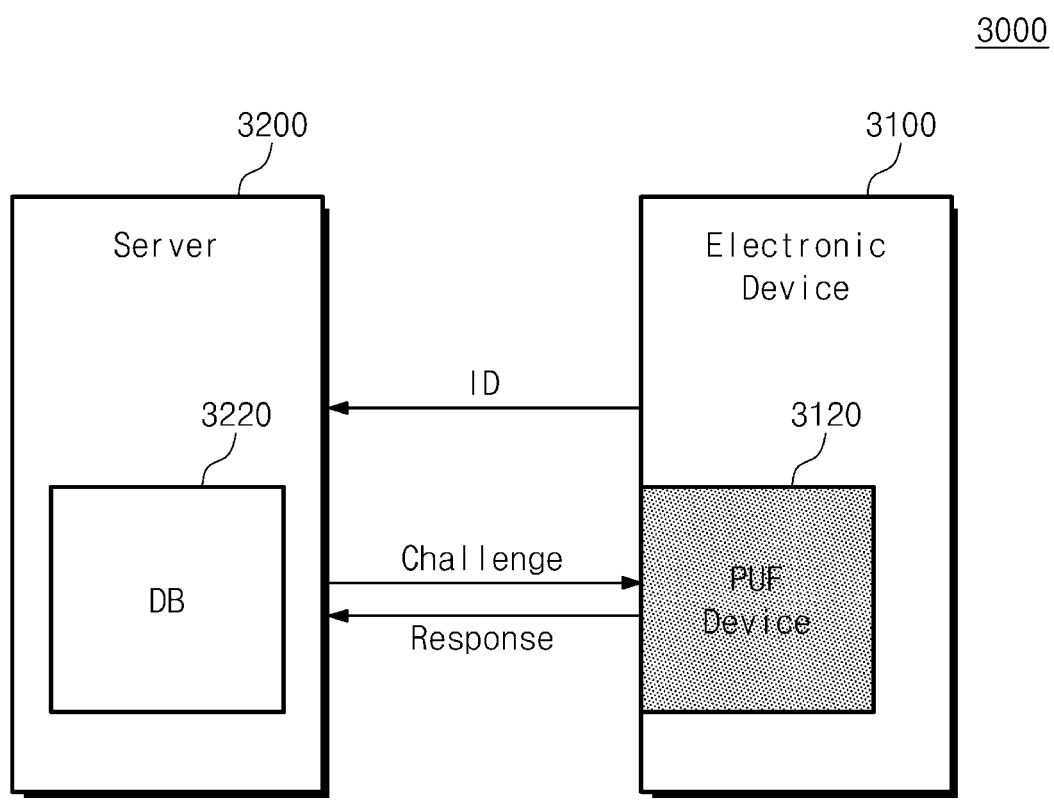
FIG. 10 is a user authentication system including a PUF device according to example embodiments of inventive concepts.

FIG. 10 is a user authentication system including a PUF device according to example embodiments of inventive concepts. Referring to FIG. 10, a user authentication system 3000 includes an electronic device 3100 and a server 3200. In FIG. 10, the PUF device 3120 is used in authentication procedure of the electronic device 3100.

The electronic device 3100 may provided a user ID generated from the PUF device 3120 to the server 3200. The server 3200 may check whether the user ID provided from the electronic device 3100 is registered in database (DB) 3220. When the user ID is registered, the server 3200 may generate a challenge. The server 3200 may provide a challenge for user authentication to the electronic device 3100.

The electronic device 3100 may receive the challenge from the server 3200 and generate a quantize signal using the PUF device 3120. The PUF device 3120 may generate a response from the quantize signal and provide the response to the server 3200. The user authentication system 3000 according to example embodiments of inventive concepts may include the PUF device 3120 with very large randomness in the electronic device 3100 to safely perform authentication procedure.

With a PUF device according to example embodiments of inventive concepts, a plurality of responses for a single challenge may be generated. Thus, randomness may be significantly enhanced and user authentication may be safely performed from an external attack.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of inventive concepts is to be determined by the broadest permissible interpretation of the following claims and their equivalents and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A physically unclonable function (PUF) device comprising:
a memory cell array including a plurality of memory cells;
a selecting circuit configured to select one or more memory cells among the plurality of memory cells in response to a challenge; and
a sense amplifier and quantizer configured to generate a quantize signal from the selected memory cell,
wherein the PUF device performs a plurality of program-initialize cycles (P/E cycles) on the selected memory cell to generate the quantize signal based on a cycle-to-cycle variation of the selected memory cell, and
wherein the PUF device obtains a resistance state section of a program state of the selected memory cell based on the cycle-to-cycle variation of the selected memory cell, divides the resistance state section into a plurality of quantization sections based on a plurality of reference resistors, and generates a plurality of quantize signals corresponding to the plurality of quantization sections, respectively, by comparing a resistance level of the selected memory cell with resistance levels of the plurality of reference resistors.

2. The PUF device as set forth in claim 1, wherein the plurality of memory cells are multi-level cells (MLCs).

3. The PUF device as set forth in claim 1, wherein address information for selecting one or more memory cells among the plurality of memory cells is included in the challenge.

4. The PUF device as set forth in claim 3, wherein information on a resistance state level of the selected memory cell is included in the challenge.

5. The PUF device as set forth in claim 4, wherein resistance state-data matching information of the selected memory cell is included in the challenge.

6. The PUF device as set forth in claim 5, wherein the plurality of memory cells are nonvolatile memory cells.

7. The PUF device as set forth in claim 6, wherein the nonvolatile memory cell is a memory cell of a resistive RAM (RRAM).

8. The PUF device as set forth in claim 5, further comprising:
a key generator configured to generate a key from the quantize signal.

9. The PUF device as set forth in claim 5, wherein the selecting circuit comprises:
a row decoder configured to select one or more wordlines in response to row address information included in the challenge; and
a column decoder configured to select one or more bitlines in response to column address information included in the challenge,
wherein one or more memory cells among the plurality of memory cells are selected by the selected wordline and the selected bitline.

10. The PUF device as set forth in claim 1, wherein the PUF device generates the quantize signal by performing a logical operation on the plurality of quantize signals.

11. An operation method of a physically unclonable function (PUF) device for use in a user authentication system, the operation method comprising:
selecting one or more memory cells among a plurality of memory cells in response to a challenge;
performing a plurality of program-initialize cycles (P/E cycles) on the selected memory cell to obtain a resistance state section of a program state of the selected memory cell based on a cycle-to-cycle variation of the selected memory cell;
dividing the resistance state section into a plurality of quantization sections based on a plurality of reference resistors to generate a plurality of quantize signals corresponding to the plurality of quantization sections, respectively; and
generating a quantize signal based on the plurality of quantize signals.

12. The operation method as set forth in claim 11, wherein the PUF device is an MLC nonvolatile memory configured to store a plurality of data bits in a single memory cell.

13. The operation method as set forth in claim 12, wherein the MLC nonvolatile memory is a resistive RAM (RRAM).

14. The operation method as set forth in claim 11, wherein the user authentication system further comprises a server configured to provide the challenge to the PUF device, and
wherein the operation method further comprising:
generating a key through the quantize signal;
encrypting the key; and
providing the encrypted key to the server.

15. The operation method as set forth in claim 11, wherein the challenge includes address information for selecting one or more memory cells among the plurality of memory cells and information on a resistance state level of the selected memory cell.

16. The operation method as set forth in claim 15, wherein the PUF device comprises:
a resistive RAM (RRAM) including a plurality of memory cells; and
a memory controller configured to control the RRAM, and
wherein the memory controller receives the challenge and controls a resistance state-data matching scheme of the selected memory cell.

17. The operation method as set forth in claim 11, wherein the plurality of quantize signals are generated by comparing a resistance level of the selected memory cell with resistance levels of the plurality of reference resistors.

18. The operation method as set forth in claim 17, further comprising generating the quantize signal by performing a logical operation on the plurality of quantize signals.

* * * * *